United States Patent [19]
Gordon

[11] 3,765,941
[45] Oct. 16, 1973

[54] METHOD OF PREVENTING INOPERATION OF A COMPONENT BY LOOSE PARTICLES OF MATERIAL

[75] Inventor: George Simon Gordon, Philadelphia, Pa.

[73] Assignee: RCA Corporation, Princeton, N.J.

[22] Filed: Jan. 4, 1971

[21] Appl. No.: 103,373

[52] U.S. Cl............ 134/42, 134/6, 134/32, 200/168 G, 335/2
[51] Int. Cl............................................ B08b 7/00
[58] Field of Search ............. 134/42, 1, 6, 8, 134/32, 33; 355/15; 200/168 G; 15/104 A; 209/45, 49

[56] References Cited
UNITED STATES PATENTS

| | | | |
|---|---|---|---|
| 2,800,215 | 7/1957 | Converse | 15/104 A |
| 3,236,359 | 2/1966 | Stauber | 134/1 X |
| 3,402,076 | 9/1968 | Johnson | 134/6 X |
| 3,553,410 | 1/1971 | Morva | 200/168 |

Primary Examiner—Morris O. Wolk
Assistant Examiner—Tim Hagan
Attorney—Glenn H. Bruestle, H. Christoffensen and R. Williams

[57] ABSTRACT

Electrical components are provided with a pressure-sensitive adhesive fixed within an enclosure for the component. Any loose particles of material dislodged from the component and/or dust are trapped by the adhesive. The method of preventing inoperation of the component, resulting from contaminating particles, comprises disposing the pressure-sensitive adhesive within an enclosure for the component and vibrating the component to dislodge any particles loosely adhered thereto so as to trap the loose particles on the adhesive.

4 Claims, 1 Drawing Figure

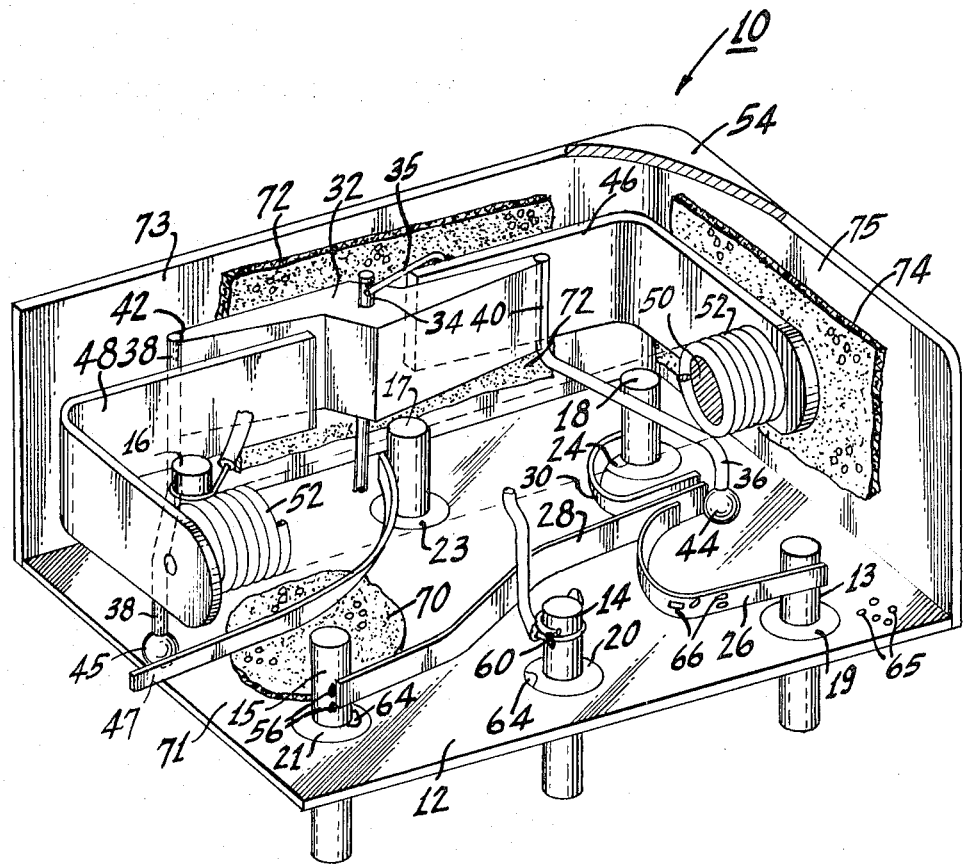
Inventor:
GEORGE S. GORDON
By Arthur J. Spechler
Attorney

METHOD OF PREVENTING INOPERATION OF A COMPONENT BY LOOSE PARTICLES OF MATERIAL

BACKGROUND OF THE INVENTION

This invention relates to means for and a method of preventing inoperation of a component by loose particles of material; and, more particularly, to means for and a method of safely immobilizing unwanted loose particles in an electromechanical component with a pressure-sensitive adhesive. The novel means and method are particularly useful in the manufacture and testing of electromechanical and electronic components in apparatus for moving vehicles.

In relatively complex electronic systems provided for use in moving vehicles, such as outerspace ships or satellites, for example, where there is considerable vibration and rotation of apparatus, a system may become inoperative because dislodged loose particles of material or dust interfere with the mechanical or electrical functioning of a component. It has been proposed to test electrical components, such as relays, by first subjecting them to vibration and then testing them for operation. While a component may satisfactorily pass such a test in a factory, it may still contain loose particles of material that later become dislodged during normal use of the device. Such loose particles and dust may eventually interfere, however, with the satisfactory functioning of the component in a moving vehicle. Also, while loose particles within an enclosure of an electrical component may not interfere with its operation on earth during test, dislodged loose particles of material will float in space where the pull of gravity is markedly decreased, and these unwanted particles may interfere with the satisfactory operation of the component and disable the system of which it is a part.

SUMMARY OF THE INVENTION

Means for preventing inoperation of a component, capable of becoming inoperative by loose particles of material, comprises a pressure-sesitive adhesive disposed on or adjacent the component so as to trap thereon the loose particles of material. The novel method of preventing inoperation of a component, capable of becoming inoperative by loose particles of material, comprises disposing a pressure-sensitive adhesive adjacent to parts of the component and shaking the component to dislodge any particles loosely adhered thereto so as to trap the particles on the adhesive.

DESCRIPTION OF THE DRAWING

The single FIGURE of the drawing is a fragmentary perspective view, with parts broken away, of an electrical relay, illustrating the novel means for preventing its inoperation by dislodged particles of material.

DESCRIPTION OF THE PREFERRED EMBODIMENT

Referring now to the drawing, there is shown an electromagnetically operated relay 10 of the type whose electrical and mechanical operation is capable of becoming inoperative by loose particles of material. The relay 10 comprises a header, metal base plate 12, having a plurality of metal header pins 13 – 18, inclusive, extending through the base plate 12 and insulated from it by insulators 19 – 24, respectively. The insulators 19 – 24 comprise an insulating material, such as glass, porcelain, or other ceramic material.

One end of an elongated curved, resilient, normally closed (NC), electrical contact 26 is soldered or welded to the pin 13. The other end of the contact 26 makes an electrical connection with one (free) end of an elongated, resilient, common electrical contact 28. The other end of the contact 28 is soldered to the pin 15. Thus, electrical connections to the pins 13 and 15 are electrically connected to each other through the resilient contacts 26 and 28.

Another curved, resilient, normally open (NO), electrical contact 30 has one end soldered to the pin 18 and an opposite end adjacent to, but slightly spaced from, the free end of the contact 28.

An elongated armature 32 of soft iron is disposed for rotation in a plane parallel to the base plate 12 and about a vertical axis 34 by any suitable means (not shown). The armature 32 is symmetrical in structure about its axis 34 and is urged, when not actuated, in a clockwise direction by a spring 35, one end of which is fixed to a pole piece 46 by any suitable means. A pair of downwardly extending wire members 36 and 38 are fixed to opposite ends 40 and 42 of the armature 32, respectively, for the purpose hereinafter appearing. A ball 44 of electrically insulating material is disposed at the free end of the member 36 adjacent the free end of the contact 28. A ball 45, similar to the ball 44, is disposed at the free end of the member 38 adjacent a free end of a resilient, common, electrical contact 47. The other end of the contact 47 is soldered to the pin 17.

Means are provided to actuate the armature 32, causing it to rotate in a counterclockwise direction about the axis 34. To this end, the pole piece 46, bent in the form of a right angle, is fixed, by any suitable means (not shown), so that its free end is adjacent to one side (rear) of the armature 32. A pole piece 48, similar to the pole piece 46, is fixed, by any suitable means (not shown), so that its free end is adjacent to the other side (front) of the armature 32. The pole pieces 46 and 48 are provided with an iron core 50 and a coil 52, in a manner well known in the art. The pin 14 is connected to one end of the coil 52, and the pin 16 is connected to the other end of the coil 52 so that, when a source of voltage is applied between the pins 14 and 16, the pole pieces 46 and 48 are magnetized with opposite polarities to cause the armature 32 to be attracted to them. Thus, when actuated, the armature 32 rotates in a counterclockwise direction. When the armature 32 is not actuated, the spring 35 urges it in a clockwise direction, that is, away from the pole pieces 46 and 48.

When the coil 52 is energized, the armature 32 rotates in a counterclockwise direction and causes the ball 44 to move the free end of the common contact 28 into electrical contact with the free end of the contact 30, and, thereby break the electrical connection with the free end of the contact 26. Thus, any electrical connections to the pins 15 and 18 can be connected electrically to each other through the contacts 28 and 30 of the relay 10.

The relay 10 has other contacts and pins (not shown), but they are not described herein because they are not necessary to the illustration and understanding of the present invention.

Means are provided to protect the parts of the relay 10. To this end, a cover 54 is fixed to the base plate 12 by any suitable means to form an enclosure with the base plate 12. For example, the cover 54 may be pressure fitted over the base plate 12 or it may be attached to the base plate 12 by any suitable fastening means (not shown).

In the operation and/or normal wear of the relay 10, especially if employed in a moving vehicle, particles of material may become dislodged from one or more parts of the relay 10, and these particles of material may interfere with the normal functioning of the relay 10. Weld flashes, for example, in the form of balls or pieces of metal or solder, such as particles 56 and 60 from the pins 15 and 14, respectively, may become dislodged and move within the enclosure of the relay 10. Also, particles 64 of glass or ceramic chips from the insulators 19 – 24 may become dislodged within the enclosure of the relay 10. Dirt and/or dust particles 65 may also find its way into the enclosure of the relay 10. Another source of particles of material detrimental to the operation of the relay 10 are flaked particles 66 of metal plating from the metal plated contacts 26, 28, 30, and 47. These contacts are continually stressed and particles 66 of metal plating may eventually flake off. All of these dislodged particles, including dirt and/or dust, may either find their way between electrical contacts, as for example, between the contacts 26 and 28 or between the contacts 28 and 30, and prevent these contacts from either making or breaking electrical connections with each other when such functions are required. The dislodged particles of material may also interfere with the mechanical operation of the relay 10 by lodging themselves in strategic places, as between the pole piece 46 and the armature 32 or between the pole piece 48 and the armature 32, thereby preventing the armature 32 from rotating when actuated. Loose particles of material may also become lodged in armature axis bearings, thus binding the armature.

Means are provided to prevent the dislodged particles 56, 60, 64, 65, and 66 from interfering with the normal operation of the relay 10. To this end, one or more layers of a pressure-sensitive adhesive are disposed within the enclosure of the relay 10 to trap the loose particles of material thereon. For example, a layer 70 of a pressure-sensitive adhesive is disposed on the upper surface 71 of the base plate 12 within the enclosure. Layers 72 and 74 of the pressure-sensitive adhesive are disposed on adjacent inner, side walls 73 and 75, respectively, of the cover 54. The dimensional areas and thickness of the layers 70, 72, and 74 are not critical and may cover any surface that does not interfere with the normal operation of the component. Other layers of the pressure-sensitive adhesive may be disposed on other surfaces within the enclosure of the relay 10 as deemed necessary, depending upon the amount of dislodged particles of material anticipated and the packing density within the component.

Pressure-sensitive adhesives of the type used herein are defined as those adhesives that adhere tenaciously upon application to a surface with only light finger pressure. Pressure-sensitive adhesives are usually composed of a rubbery type elastomer combined with a liquid or solid resin tackifier component. A mixture of resins may be used to provide a balance of properties that cannot be obtained by any single resin. Fillers are often added to change the rheological properties of the adhesive. Antioxidants are also used to stabilize the adhesive against heat and light degradation, in a manner well known in the pressure-sensitive adhesive art.

Typical ingredients used in pressure-sensitive adhesives are:

ELASTOMERS

Reclaimed rubber
SBR (styrene butadiene rubber)
Polyisobutylene or butyl rubber
Buna-N (butadiene acrylonitrile rubber)
Polyvinyl ethers (ethyl or higher)
Polyacrylate esters (ethyl or higher)

TACKIFIERS

Polyterpene resins
Gum rosin
Rosin esters and other rosin derivatives
Oil-soluble phenolic resins
Coumarone-indene resins
Petroleum hydrocarbon resins

PLASTICIZERS

Mineral oil
Liquid polybutenes
Liquid polyacrylates
Lanolin

FILLERS

Zinc oxide
Titanium dioxide
Aluminum hydrate
Calcium carbonate
Clay
Pigments

ANTIOXIDANTS

Rubber antioxidants (preferably nonstaining)
Metal dithiocarbamates
Metal chelating agents Typical examples of suitable pressure-sensitive adhesives are:

| | Parts by Weight |
|---|---|
| ADHESIVE A | |
| Milled pale crepe | 100 |
| Poly-beta-pinene resin (m.p. 70°C) | 75 |
| Petroleum oil | 5 |
| Polymerized trimethyl dihydroquinoline | 2 |
| ADHESIVE B | Parts by Weight |
| Milled smoke sheet rubber | 100 |
| Zinc oxide | 50 |
| Dehydrogenated rosin | 75 |
| Lanolin | 10 |
| Sym-di-beta-naphthyl-para-phenylene diamine | 2 |
| ADHESIVE C | Parts by Weight |
| Butadiene styrene copolymer (70:30 ratio, Mooney value 50) | 50 |
| Milled smoked sheet rubber | 50 |
| Ester of hydrogenated rosin | 50 |
| Polymerized trimethyl dihydroquinoline | 2 |
| Petroleum oil | 20 |
| ADHESIVE D | Parts by Weight |
| Polyvinyl ethyl ether (intrinsic viscosity = 2.37) | 100 |
| Hydrogenated rosin | 50 |
| Phenyl-alpha-naphthylamine | 0.35 |
| Polyethylene glycol 400 diricinoleate | 11.5 |
| ADHESIVE E | Parts by Weight |
| Polyisobutylene (high molecular weight polymer) | 100 |
| Polyisobutylene (viscous liquid) | 70 |

These pressure-sensitive adhesives may be applied to a clean surface as follows: A solution of an adhesive mass, consisting of the pressure-sensitive adhesive and a solvent therefor, usually benzene, toluene, naphtha, or other suitable organic solvent, is sprayed, doctorknifed, brushed, or roller-coated on the cleaned surface. The solvent is then evaporated, leaving a layer of the pressure-sensitive adhesive. A layer having a thickness in the range between about one sixty-fourth and one-sixteenth inch is suitable for a relay 10 of the type described. The thickness of the layer is not critical and will vary with the components to which it is fixed, depending upon the amount of dislodged particles anticipated.

Other suitable styrene butadiene rubber adhesives are described in U.S. Pat. No. 3,413,246. Polyacrylate and polyurethane polymer pressure-sensitive adhesives that may also be used are described in U.S. Pat. No. 3,515,578 and 3,437,622, respectively. Silicon resin adhesives, manufactured by Dow Corning and designated as DC271, DC280, DC280A, DC281, and DC285, may also be used. Suitable pressure-sensitive adhesives, manufactured by General Electric, are designated as SR520, SR527, and SR585. Where permissible, film transfer tape X1140 or double-backed masking tape, such as "Permacel," both manufactured by the 3M Company, may also be used instead of the aforementioned layers of the pressure-sensitive adhesive. The area dimensions of the layers of the pressure-sensitive adhesive are not critical and will depend upon the anticipated amount of particles of material to be trapped.

In practicing the novel method of preventing inoperation of a component, such as the relay 10, having parts capable of becoming inoperative by loose particles of material, layers of pressure-senstive adhesives, such as the layers 70, 72, and 74, are disposed within the enclosure of the relay 10 adjacent to, but not in contact with, the movable parts and the electrical contacts of the relay 10. Next, the relay 10 is vibrated, as in a suitable vibration testing machine at a frequency of between say 10 to 100 Hz with an acceleration of between 2 and 10g (32 ft/sec$^2$), depending upon the component, until no noise that may be caused by dislodged particles is heard from within the component. If necessary, because of the small size of a component, a sonic detector and amplifier therefore can be used to detect the noise signatures of the particles within the component and verify, by an absence of noise, that all the dislodged particles are trapped. Any dislodged particles of material, in the form of weld flashes, glass or ceramic chips, metal or solder balls, machining or process burrs, peeled metal plating, and dirt and/or dust, for example, that may interfere with the operation of the relay 10, as explained above, are captured and immobilized by the layers 70, 72, and 74 of the pressure-sensitive adhesives. Frequencies and accelerations of vibration beyond the aforementioned ranges may be used if the component being tested can withstand them. Also, either single, three-axis, random or shock vibration may be employed to dislodge particles of material loosely joined to the component.

Although the means and method of the present invention were described and illustrated with a component in the form of an electrical relay, it is within the contemplation of the present invention for the novel means and method to apply to any electrical and/or mechanical components capable of becoming inoperative by loose particles of material.

I claim:

1. A method of preventing inoperation of a component, having parts enclosed within said component capable of becoming inoperative by loose particles of material, comprising the steps of
    disposing a pressure-sensitive adhesive adjacent said parts of said component; and,
    shaking said component to dislodge any particles loosely adhered thereto and to trap said particles on said adhesive.

2. A method of preventing inoperation of a component as described in claim 1, wherein
    said component comprises cover means defining an enclosure for said parts;
    said pressure-sensitive adhesive is disposed within said enclosure; and,
    the step of shaking said component comprises vibrating said component at a random frequency to dislodge loosely adhered particles within said enclosure and to trap said particles on said adhesive.

3. A method of preventing inoperation of a component as described in claim 1, wherein
    said component has a cover forming an enclosure for said component,
    said pressure-sensitive adhesive is disposed on at least a portion of the inner surface of said cover, and
    said shaking said component comprises vibrating said component at a frequency of between 10 and 100 Hz with an acceleration of between 2 and 10g until no noise, characteristic of said particles moving within said enclosure, is heard during said vibrating.

4. A method of preventing inoperation of a component as described in claim 1, wherein
    said component has a cover forming an enclosure for said component,
    said pressure-sensitive adhesive is disposed within said enclosure, and
    the step of shaking said component is continued until no noise, characteristic of said particles moving within said enclosure, is heard within said enclosure.

* * * * *